No. 802,617. PATENTED OCT. 24, 1905.
W. W. WHITCOMB.
COMPOSITE PULLEY.
APPLICATION FILED JULY 15, 1903.

Witnesses.
C. H. Garnett
M. E. Morton

Inventor.
William W. Whitcomb
by Jas. H. Churchill
atty.

UNITED STATES PATENT OFFICE.

WILLIAM W. WHITCOMB, OF BROOKLINE, MASSACHUSETTS.

COMPOSITE PULLEY.

No. 802,617.     Specification of Letters Patent.     Patented Oct. 24, 1905.

Application filed July 15, 1903. Serial No. 165,651.

*To all whom it may concern:*

Be it known that I, WILLIAM W. WHITCOMB, of Brookline, county of Norfolk, and State of Massachusetts, have invented an Improvement in Composite Pulleys, of which the following description, in connection with the accompanying drawings, is a specification, like letters on the drawings representing like parts.

This invention relates to a composite pulley, and has for its object to provide a strong, durable and light pulley of maximum frictional capacity which can be produced at a minimum cost. For this purpose the composite pulley is composed of a metal felly, which may be of iron, steel, or other metal, plain or ribbed, and a non-metallic rim, preferably of wood, which is secured to the outside of the metal felly in any suitable manner, and inserts of softer material, preferably cork, which are fitted into suitable sockets in the said wooden rim. These and other features of this invention will be pointed out in the claims at the end of this specification.

Figure 1:
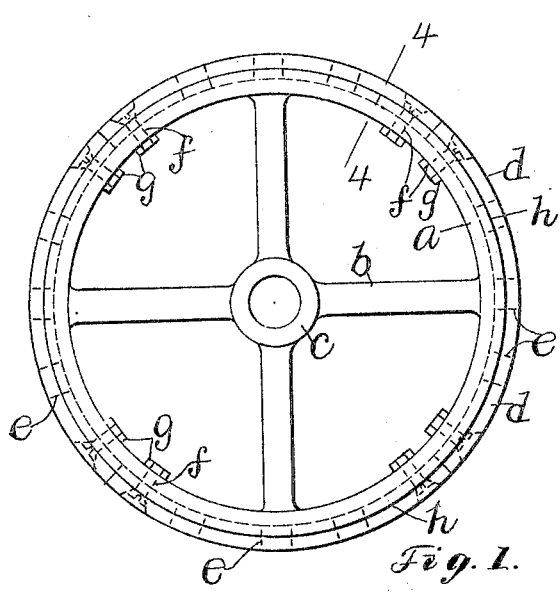
Figure 2:
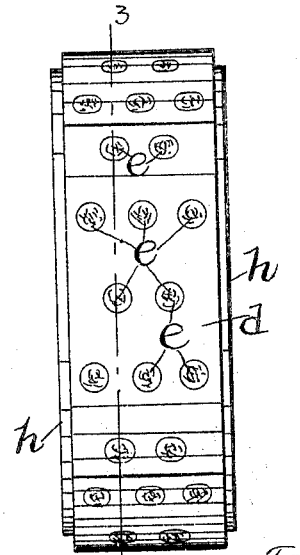
Figure 4:
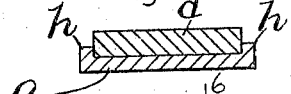
Figure 3:
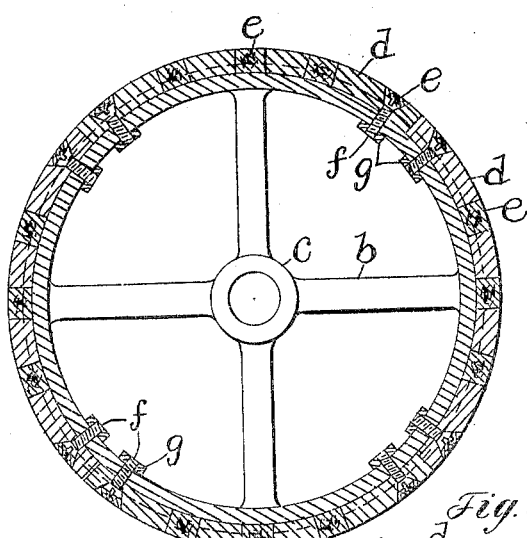
Figure 6:
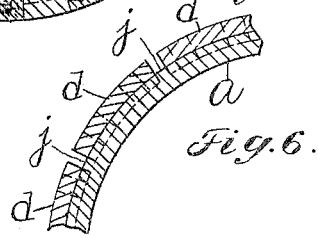
Figure 5:
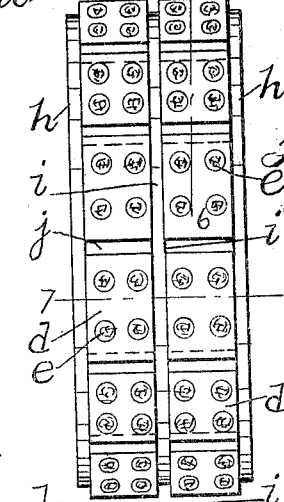

Figure 1 is a side elevation of a pulley embodying this invention; Fig. 2, a front elevation of the pulley shown in Fig. 1; Fig. 3, a section on the line 3 3, Fig. 2; Fig. 4, a section on the line 4 4, Fig. 1; Fig. 5, a front elevation of a modified form of the pulley; Fig. 6, a section on the line 6 6, Fig. 5; and Fig. 7, a section on the line 7 7, Fig. 5.

Referring to the drawings, $a$ represents a metal felly connected by the spokes $b$ with the hub $c$, which parts may be of a construction common to metal pulleys, except that in the present instance the felly $a$ may be made materially thinner than the rims of metal pulleys of ordinary construction. In accordance with this invention the metal felly $a$ has secured to its outer side a non-metallic rim $d$, preferably of wood and which is provided with one or more sockets or openings extended through it for the reception of one or more inserts $e$, preferably of cork, which may be forced into the sockets and retained therein by the expansion of the cork. The rim $d$ may be made in one or more pieces, as desired.

In Fig. 1 the rim $d$ is shown as composed of four sections, which are secured to the metal felly $a$ by bolts $f$ and nuts $g$. The bolts $f$ may have their heads seated in sockets in the wooden rim and covered by a substantially thin insert of cork. The inserts $e$ may be of any desired form and preferably extend entirely through the wooden rim $d$ and bear or rest upon the metal felly $a$.

Figure 7:
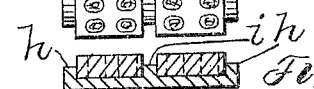

The felly $a$ may be made plain, or it may be provided with ribs $h$, as shown in Figs. 1 and 4, or it may be ribbed after the manner shown in Figs. 5, 6, and 7, wherein the felly $a$ is shown as provided not only with the side ribs $h$, but with an intermediate rib $i$ and cross-ribs $j$, which latter form with the ribs $i$ $h$ a series of pockets into which the wooden rim in sections is secured, the said wooden sections being provided with the cork inserts.

The wooden rim $d$ may be made of any desired thickness, and any tendency of the rim $d$ to shrink causes it to hug the metal pulley and does not detract from the frictional efficiency of the pulley, inasmuch as the cork inserts are not withdrawn by such shrinkage from contact with the belt used with the pulley. The wooden rim serves as a carrier for the cork inserts and enables the metal portion of the pulley, especially the felly $a$, to be made very light. The ribs on the metal felly enable the latter to be made very thin without sacrificing the strength of the pulley. Furthermore, the composite pulley can be made at a minimum expense without diminishing its strength and durability or its gripping efficiency.

I claim—

1. A composite pulley provided with a metal felly, a non-metallic rim on the outside thereof and composed of sections which are provided with sockets, inserts of softer material extended into said sockets and forming part of the gripping-surface of said pulley, and means extended through said sections and said felly to detachably secure said rim to said felly, substantially as described.

2. A composite pulley provided with a metal felly having ribs, a wooden rim composed of sections secured to the outside of the metal felly and each provided with openings extended through it, cork inserts secured in said openings and forming part of the gripping-surface of said pulley and extended through the said rim to bear against said felly, and means extended through said sections and said felly to detachably secure said rim to said felly, substantially as described.

3. A composite pulley provided with a metal felly, a wooden rim composed of sections secured to the outer side of said metal felly and each provided with openings extended through it, cork inserts fitted into said openings to form part of the gripping-surface of the pulley and extended through the said rim to bear against said felly, and means extended through said sections and said felly to detachably secure said rim to said felly, substantially as described.

In testimony whereof I have signed my name to this specification in the presence of two subscribing witnesses.

WM. W. WHITCOMB.

Witnesses:
JAS. H. CHURCHILL,
MARY E. MORTON.